UNITED STATES PATENT OFFICE.

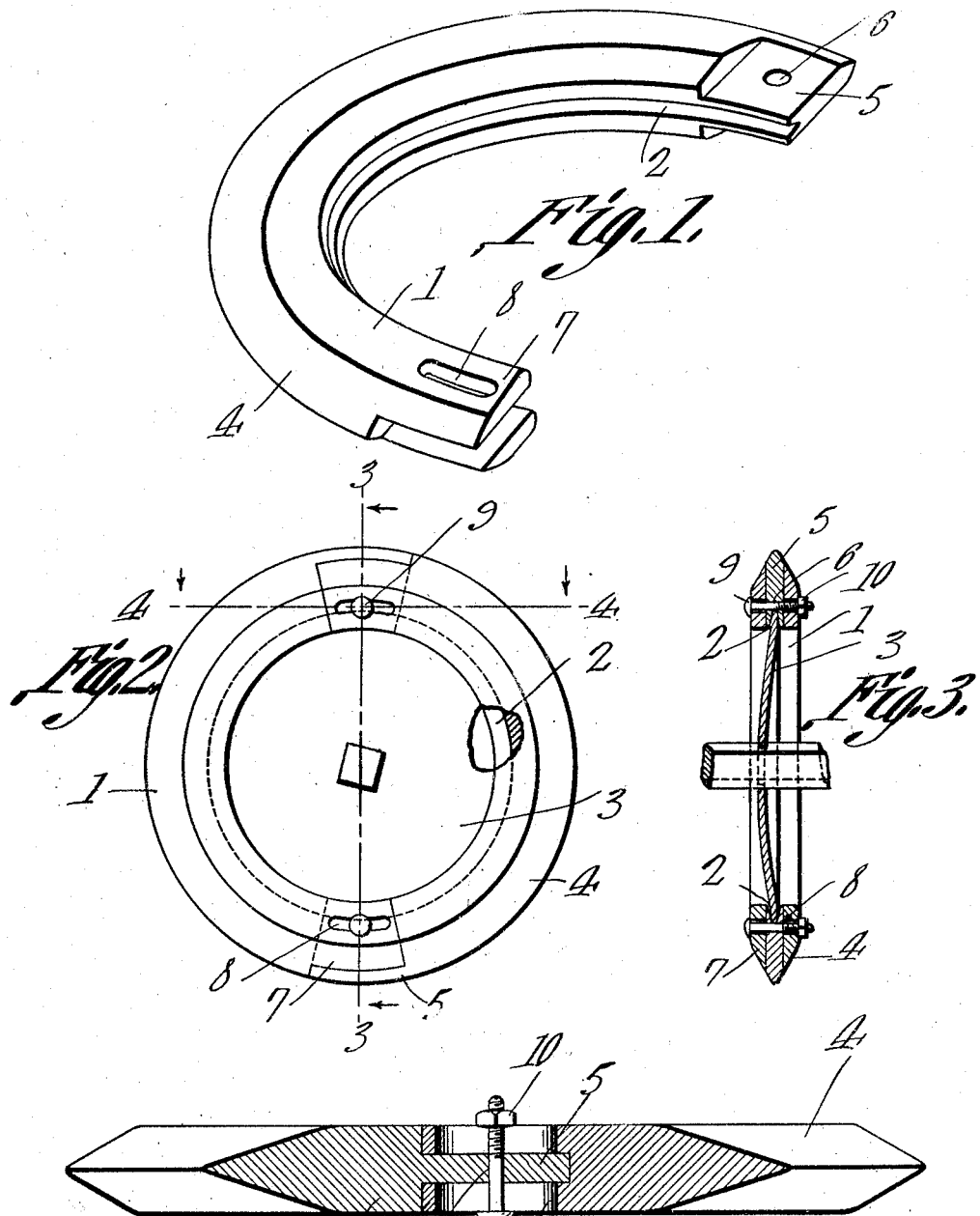

PETER H. NOONAN AND JOHN NOONAN, OF NOONAN, NORTH DAKOTA.

DISK-HARROW ATTACHMENT.

1,006,589.  Specification of Letters Patent.  Patented Oct. 24, 1911.

Application filed June 1, 1911. Serial No. 630,616.

*To all whom it may concern:*

Be it known that we, PETER H. NOONAN and JOHN NOONAN, citizens of the United States, residing at Noonan, in the county of Divide, State of North Dakota, have invented a new and useful Disk-Harrow Attachment, of which the following is a specification.

It is the object of the present invention to provide a sub-soil packer of segmental form, adapted to be mounted peripherally upon a harrow disk, to convert an ordinary disk harrow, into a sub-soil packer.

A further object of the invention is to provide novel means for connecting, adjustably, the ends of the segmental sections of the sub-soil packer.

A further object of the invention is to provide, as an article of manufacture, a segmental member, adapted to be duplicated, to form a sub-soil packer, which may be assembled with the periphery of a harrow disk.

In the accompanying drawings,—Figure 1 shows in perspective, one of the segmental sections which go to make up the sub-soil packer; Fig. 2 is a side elevation of a harrow disk, with the periphery of which, the sub-soil packer of our invention is assembled; Fig. 3 is a section on the line 3—3 of Fig. 2; Fig. 4 is a section on the line 4—4 of Fig. 2.

The sub-soil packer herein disclosed, consists of two or more sections, each of which is fashioned in accordance with the showing of Fig. 1. The segmental sections which go to make up the sub-soil packer, are identical in construction, there being no rights and lefts in the device, each of these segmental sections being denoted generally by the numeral 1. In the intrados of the segmental section 1, there is a groove 2, adapted to fit over the periphery of the harrow disk 3. The section 1, at its periphery, is beveled, as shown at 4. At one end, the section 1 is fashioned with a tongue 5, in which there is an opening 6, ordinarily circular in contour, although not necessarily so. At its opposite end, the section 1 is formed with spaced arms 7. These arms 7 are adapted to receive between them, the tongue 5 of a similar section. In the arms 7 there are elongated openings 8, extended longitudinally of the section 1.

In practical operation, a pair of sections 1 are placed about the periphery of the harrow disk 3, the tongue 5 upon one member, registering between the arms 7 of the adjoining member, the openings 6 alining with the openings 8. Through the alined openings, a securing device is inserted, the securing device preferably, although not necessarily, consisting of a bolt 9, provided with a nut 10.

From the foregoing it will be seen that an ordinary disk-harrow may be converted readily, into a sub-soil packer, by attaching to the disks of the harrow, the segmental sections herein disclosed. The nut and bolt structures 9—10 serve to unite the sections 1 with the harrow-disk 3, the periphery of which is received within the groove 2, the elongated openings 8 permitting an adjustment between the sections 1.

It is to be noted that the sections 1 are identical in construction. Therefore, there are no rights or lefts in the device, and but one form of packer section need be manufactured and carried in stock.

Having thus described the invention what is claimed is:—

As an article of manufacture, a member formed in the segment of a circle, and having an internal groove, adapted to receive the periphery of a harrow disk, said segmental member being formed at one end with a tongue, and at the other end with spaced arms, adapted to receive the tongue of a like member; there being elongated openings in the arms, and an opening in the tongue, of less extent than the openings in the arms.

In testimony that we claim the foregoing as our own, we have hereto affixed our signatures in the presence of two witnesses.

PETER H. NOONAN.
JOHN NOONAN.

Witnesses:
 ALBERT H. MAKEE,
 WARD W. LEE.